(12) United States Patent
Gibert et al.

(10) Patent No.: US 8,261,046 B2
(45) Date of Patent: Sep. 4, 2012

(54) ACCESS OF REGISTER FILES OF OTHER THREADS USING SYNCHRONIZATION

(75) Inventors: Enric Gibert, Sant Cugat Del Vallès (ES); Josep M. Codina, Hospitalet De Llobregat (ES); Fernando Latorre, Huesca (ES); José Alejandro Piñeiro, Barcelona (ES); Pedro López, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 12/446,930

(22) PCT Filed: Oct. 27, 2006

(86) PCT No.: PCT/ES2006/070162
§ 371 (c)(1),
(2), (4) Date: Apr. 23, 2009

(87) PCT Pub. No.: WO2008/049938
PCT Pub. Date: May 2, 2008

(65) Prior Publication Data
US 2010/0005277 A1    Jan. 7, 2010

(51) Int. Cl.
*G06F 9/30* (2006.01)
(52) U.S. Cl. .................................................. 712/216
(58) Field of Classification Search .................. None
See application file for complete search history.

(56) References Cited

U.S. PATENT DOCUMENTS

| 5,187,796 | A |   | 2/1993  | Wang et al.              |
|-----------|---|---|---------|--------------------------|
| 5,784,630 | A |   | 7/1998  | Saito et al.             |
| 5,845,307 | A | * | 12/1998 | Prabhu et al. ...... 711/2 |
| 5,887,166 | A | * | 3/1999  | Mallick et al. ...... 718/102 |
| 5,913,059 | A | * | 6/1999  | Torii ...... 718/104      |
| 5,968,160 | A |   | 10/1999 | Saito et al.             |
| 6,061,710 | A | * | 5/2000  | Eickemeyer et al. ...... 718/107 |
| 6,286,027 | B1| * | 9/2001  | Dwyer et al. ...... 718/107 |

(Continued)

FOREIGN PATENT DOCUMENTS

EP      0 612 012     8/1994

(Continued)

OTHER PUBLICATIONS

Krishnan et al. (Krishnan) (Hardware and Software Support for Speculative Execution of Sequential Binaries on a Chip-Multiprocessor); Proceeding: ICS '98 Proceedings of the 12th international conference on Supercomputing; 1998; pp. 85-92.*

(Continued)

*Primary Examiner* — Keith Vicary
(74) *Attorney, Agent, or Firm* — Trop, Pruner & Hu, P.C.

(57) ABSTRACT

In one embodiment, the present invention includes a method for accessing registers associated with a first thread while executing a second thread. In one such embodiment a method may include preventing an instruction of a first thread that is to access a source operand from a register file of a second thread from executing if a synchronization indicator associated with the source operand indicates incompletion of a producer operation of the second thread, and executing the instruction if the synchronization indicator indicates completion of the producer operation of the second thread. Other embodiments are described and claimed.

22 Claims, 5 Drawing Sheets

U.S. PATENT DOCUMENTS

| | | | |
|---|---|---|---|
| 6,950,927 B1* | 9/2005 | Apisdorf et al. | 712/216 |
| 7,149,878 B1* | 12/2006 | Jensen et al. | 712/209 |
| 7,610,470 B2* | 10/2009 | Chaudhry et al. | 712/220 |
| 2002/0103847 A1* | 8/2002 | Potash | 709/107 |
| 2002/0144083 A1* | 10/2002 | Wang et al. | 712/23 |
| 2003/0005266 A1* | 1/2003 | Akkary et al. | 712/220 |
| 2003/0084269 A1* | 5/2003 | Drysdale et al. | 712/36 |
| 2003/0188141 A1* | 10/2003 | Chaudhry et al. | 712/235 |
| 2004/0073906 A1* | 4/2004 | Chamdani et al. | 718/102 |
| 2004/0117597 A1* | 6/2004 | Kailas | 712/24 |
| 2004/0268093 A1* | 12/2004 | Samra et al. | 712/217 |
| 2005/0228975 A1* | 10/2005 | Shippy | 712/225 |
| 2006/0020775 A1* | 1/2006 | Madriles et al. | 712/235 |
| 2008/0229062 A1* | 9/2008 | Gregorio | 712/30 |
| 2008/0229312 A1* | 9/2008 | May | 718/102 |
| 2009/0106495 A1* | 4/2009 | Chou | 711/130 |

FOREIGN PATENT DOCUMENTS

| | | |
|---|---|---|
| EP | 0 762 270 A2 | 12/1997 |
| JP | H01-147651 | 9/1989 |
| JP | H04-127351 | 4/1992 |
| JP | H06-242948 | 9/1994 |
| WO | WO 99/08185 | 2/1999 |

OTHER PUBLICATIONS

Tullsen et al. (Tullsen) (Simultaneous Multithreading: Maximizing On-Chip Parallelism); ISCA '95 Proceedings of the 22nd annual international symposium on Computer architecture; 1995; pp. 392-403.*

Arroyo et al. (Dynamic Simultaneous Multithreaded Architecture); 16th International Conference on Parallel and Distributed Computing Systems; 2003; 8 pages.*

Madriles et al. (Anaphase: A Fine-Grain Thread Decomposition Scheme for Speculative Multithreading); This paper appears in: Parallel Architectures and Compilation Techniques, 2009. PACT '09. 18th International Conference on; Issue Date: Sep. 12-16, 2009; on pp. 15-25.*

Chen et al. (Integrated Support to Improve Inter-thread Communication and Synchronization in a Multithreaded Processor); This paper appears in: Parallel and Distributed Systems, 1994. International Conference on; Issue Date: Dec. 19-22, 1994; on pp. 481-486.*

Krishnan et al. (Executing Sequential Binaries on a Clustered Multithreaded Architecture with Speculation Support) in Int'l conf. on High Performance Computer ARchitecture (HPCA), 1998; 7 pages.*

Krishnan (Speculative Multithreading Architectures); Thesis submitted in partial fulfillment of the requirements for the degree of Doctor of Philosophy in Computer Science in the Graduate College of the University of Illinois at Urbana-Champaign, 1998; 122 pages.*

Marcuello (Speculative Multithreaded Processors); Dept. of Computer Architecture; Universitat Politecnica de Catalunya; Barcelona, Spain), Thesis, Jul. 2003; 167 pages.*

Redstone et al. (Mini-threads: Increasing TLP on Small-Scale SMT Processors); This paper appears in: High-Performance Computer Architecture, 2003. HPCA-9 2003. Proceedings. The Ninth International Symposium on; Issue Date: Feb. 8-12, 2003; on pp. 19-30.*

Krishnan (A Chip-Multiprocessor Architecture with Speculative Multithreading); This paper appears in: Computers, IEEE Transactions on; Issue Date: Sep. 1999; vol. 48 Issue:9; on pp. 866-880.*

German Patent and Trademark Office, Office Action mailed Jun. 18, 2010 in German application No. 11 2006 004 005.7-53.

Burton J. Smith, "Architecture and Applications of the HEP Multiprocessor Computer System," Proc. of the Int. Soc. for Opt. Engr., 1981, pp. 342-349 from Mark Hill, et al., "Readings in Computer Architecture," 1999.

German Patent Office, Office Action for DE Application No. 11 2006 004 005.7-53 (with English translation), dated Jun. 18, 2010, 5 pgs.

Smith, B.J.: Architecture and applications of the HEP multiprocessor computer system, In: Hill, M. et al (eds.): Readings in Computer Architecture. Morgan Kaufmann, 1999. pp. 342-349.

State Intellectual Property Office, P.R. China, First Office Action issued Jan. 30, 2011 in Chinese application No. 200680056225.2.

Japanese Patent Office, Notice of Reasons for Rejection mailed Jun. 28, 2011 in Japanese application No. 2009-524212.

State Intellectual Property Office, P.R. China, Second Office Action issued Jul. 7, 2011 in Chinese application No. 200680056225.2.

Japanese Patent Office, Decision of Rejection mailed Dec. 6, 2011 in Japanese application No. 2009-524212.

Andrew Wolfe, et al., "A Variable Instruction Stream Extension to the VLIW Architecture," 1991, pp. 2-14.

Stephen W. Keckler, et al., "Processor Coupling: Integrating Compile Time and Runtime Scheduling for Parallelism," 1992, pp. 1-12.

Robert Alverson, et al., The Tera Computer System, 1992, pp. 1-6.

Marco Fillo, et al., "The M-Machine Multicomputer," 1995, pp. 1-11.

Ram Rangan, et al., "Decoupled Software Pipelining With the Synchronization Array," 2004, pp. 1-12.

* cited by examiner

ACCESS OF REGISTER FILES OF OTHER THREADS USING SYNCHRONIZATION

Pursuant to 35 U.S.C. §119, this application claims priority to International Patent Application Serial No. PCT/ES2005/070162, filed Oct. 27, 2006, the subject matter of which is incorporated herein by reference.

BACKGROUND

Processors have become very complicated machines including numerous structures and complex control techniques to enable instructions and data to traverse the machine to perform different requested operations. To improve processor performance, some processors exploit instruction level parallelism (ILP). While such techniques may increase performance, they may also increase power consumption and design complexity. Accordingly, some processors are being designed to enable multiple cooperative threads via architectures that support and exploit thread level parallelism (TLP). Such processors may include multiple cores, often many small cores such as small in-order simultaneous multithreading (SMT) cores.

However, such in-order cores may be less effective than out-of-order cores in exploitation of ILP. That is, while in-order processors may efficiently manage parallel applications, single-threaded applications and serial code portions of parallel applications may not efficiently perform on such architectures. Accordingly, certain processors may break apart such applications to execute fine-grained threads to maintain minimal complexity while improving efficiency. However, excessive overheads can occur when a first thread seeks to use information of a second thread.

DETAILED DESCRIPTION

Figure 1:
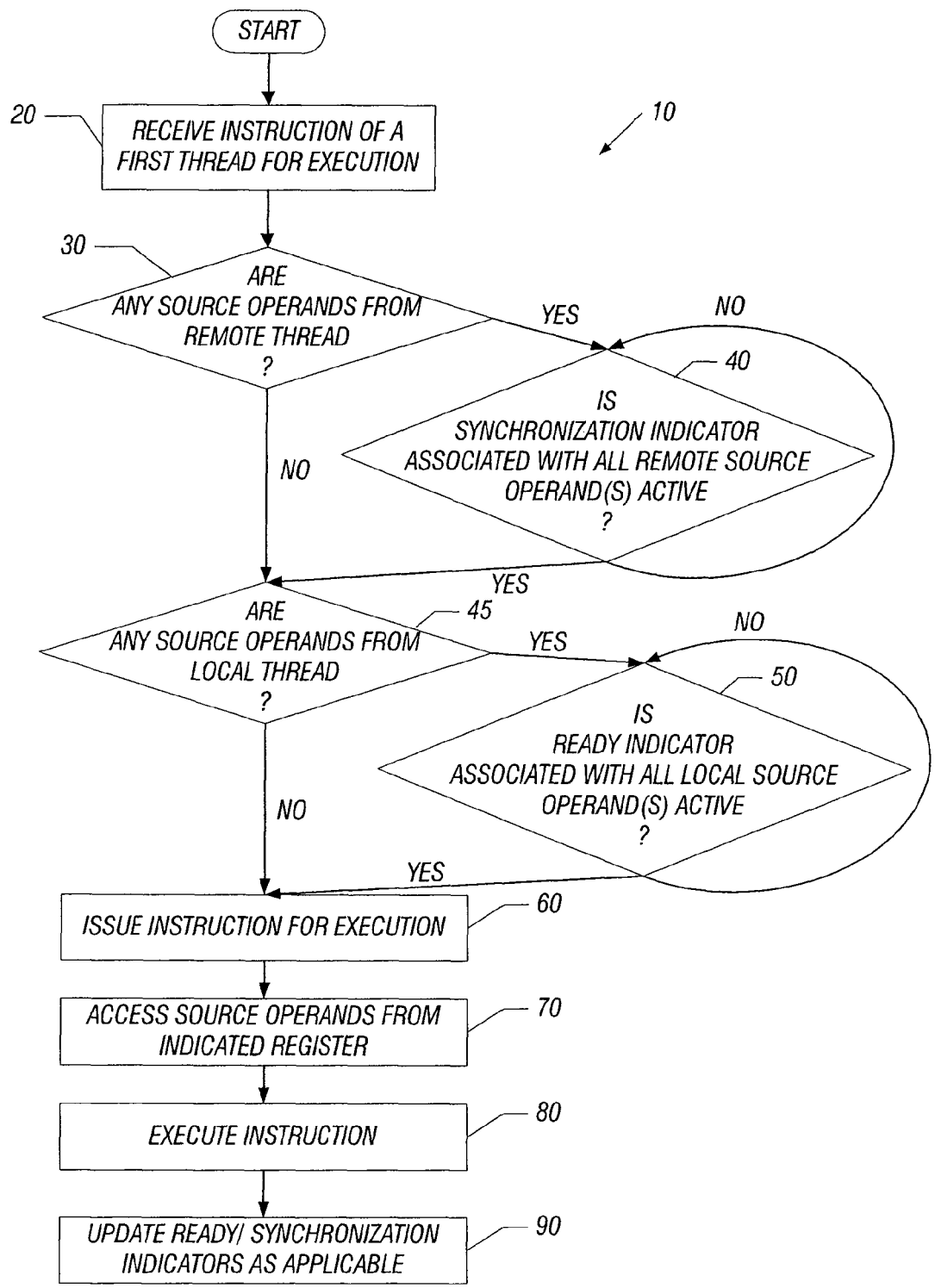
FIG. 1 is a flow diagram of a method in accordance with one embodiment of the present invention.

In various embodiments, multiple threads executing on a processor core may access values in a register file associated with another thread. Via such a communication channel, embodiments may provide for efficient simultaneous multi-threading (SMT) operation. As one example, first and second threads may execute on a single in-order processor core such as a SMT processor. Control may be provided to enable a producer/consumer model in which data values generated by the first thread may be accessed by the second thread and vice versa. Each thread may be able to read the architectural register state of the other thread during execution, permitting synchronization between threads with very low overhead.

To guarantee the reading of the correct values in given registers when they are accessed, synchronization control may be provided so that a consumer thread reads the proper data from the producer thread. In various embodiments, a scoreboard structure such as may be used in connection with instruction issuance or allocation may include synchronization indicators. More specifically, each entry in the scoreboard structure for a register of a first thread may include a synchronization indicator for the corresponding register of the second thread, and vice versa. Use of this indicator may prevent a consumer instruction from proceeding until the corresponding producer instruction in the other thread is executed so that the desired value is present in the producer register file. To take advantage of such synchronization control, embodiments may provide flow information associated with instructions. For example, flags or flowmarks may be provided with the contents of an instruction. In one embodiment, an instruction may include an opcode, source and destination operands, and flowmarks for each of the source and destination operands. As will be described further below, various mechanisms may handle generation of flowmarks for corresponding instructions. For example, compiler support may be provided so that such flowmarks may be generated during compilation according to instruction support provided in an instruction set architecture (ISA). In other implementations, an optimization mechanism, such as a hardware or software optimizer, may analyze flow control of code and generate flowmarks accordingly. In this way, multiple threads may be synchronized at instruction granularity.

Various features may take advantage of the register access and synchronization provided by embodiments of the present invention. For example, a low-overhead thread spawning mechanism may take advantage of the accessing of other threads' register files. In this way, the expense of copying all registers from a spawning thread's context to a spawned thread's context can be avoided. This is so, as the appropriate consumer instructions in the spawned thread may be marked to read operands from the spawning thread's register file instead.

According to various embodiments, overheads associated with cooperative execution between two finely-grained threads may be reduced. Accordingly, embodiments may be used in connection with support of speculative multithreading, as well as spawning of threads. Still further, embodiments may be used in connection with so-called helper threads that may be initiated to handle specific tasks that occur during execution of another thread. However, it is to be understood the scope of the present invention is not limited in this regard, and the register access and synchronization mechanisms may be used in many different implementations, including different processor architectures, systems and so forth.

Referring now to FIG. 1, shown is a flow diagram of a method in accordance with one embodiment of the present invention. As shown in FIG. 1, method 10 may be used to perform an instruction of a first thread that may access information in a register file of a second thread. As shown in FIG. 1, method 10 may begin by receiving an instruction of the first thread for execution (block 20). For example, an instruction decoder of a processor may receive and decode the instruction. In one embodiment, instructions may include an opcode to indicate a type of operation to be performed, as well as an identification of source and destination operands. In addition, the instruction may include information that indicates whether any of the source/destination operands are to be accessed from or provided to a remote register file, e.g., a register file associated with a second thread. Note that while described herein as a remote register file, it is to be understood that a local register file and remote register file may be present in a single core of a processor, such as a multiple or many-core processor including a number of in-order cores, for example.

Referring still to FIG. 1, next it may be determined whether any source operands of the instruction are to be obtained from a remote thread (diamond 30). That is, it may be determined, based on flowmark information (in one embodiment), whether any source operands are to be obtained from a remote thread, e.g., a second thread that includes a register file within the SMT core. If so, control passes to diamond 40, where it may be determined whether the synchronization indicators associated with all such remote source operand(s) are active. That is, a scoreboard or other storage that identifies state information regarding availability of values in given registers may be analyzed to determine whether all source operands to be obtained from the remote register file include the desired values. In other words, it may be determined whether a producer thread has completed an operation on which a dependent instruction of the first thread depends. If the synchronization indicator(s) are not active, diamond 40 may loop back on itself to thus hold execution of the instruction until the synchronization indicators are present. When the synchronization indicators become present, meaning that the desired values are present in the remote register, control passes to diamond 45, discussed below.

Referring still to FIG. 1, if it is determined that no source operands are from a remote threads (at diamond 30) or the synchronization indicators associated with all remote source operands are active (as determined at diamond 40), control passes to diamond 45, where it may be determined whether any source operands are from the local thread (i.e., the first thread). If so, control may pass to diamond 50, where it may be determined whether a ready indicator associated with all local source operand(s) are active. For example, the scoreboard may be accessed to determine whether an indicator that indicates that a previous producer instruction of the first thread has completed such that the dependent operation from the same thread may be performed using the proper value is active. If not, diamond 50 may loop back on itself.

From both of diamonds 45 and 50, control passes to block 60 where the instruction may be issued for execution. For example, an instruction issuer, such as an allocator, reservation station or other structure including a scoreboard or similar status storage may issue the instruction for execution. Accordingly, an execution unit such as an integer unit, floating point unit (FPU), or another such unit may access the source operands indicated from the specifically identified register file (block 70). Thus, for local source operands, the local register file associated with the thread may be accessed to obtain the source operands while for remote operands, the register file associated with the second thread, e.g., the remote register file, may be accessed.

Still referring to FIG. 1, the instruction may be executed (block 80). For example, two source operands may be added to obtain a desired result, which is to be stored in a destination operand, for example, a destination operand of the first register file. Based on the successful completion of the instruction, various indicators may be updated (block 90). More specifically, ready and synchronization indicators may be updated as applicable in a scoreboard. Continuing with the example described above, if the destination operand is indicated to be a local operand, the ready indicator associated with the destination register may be set accordingly. Furthermore, the synchronization indicator of this register may be reset to indicate that the value is not to be synchronized. If instead, the destination operand is indicated to be remotely used, a synchronization indicator of the remote (e.g., second) register file may be set accordingly. Further, a ready indicator of the local register file may be set. In this way, both a remote thread and the local thread can access the destination operand as a source operand, allowing efficient producer/consumer operation both within the same thread and between threads. While shown with this particular implementation in the embodiment of FIG. 1, it is to be understood that the scope of the present invention is not limited in this regard.

Figure 2:
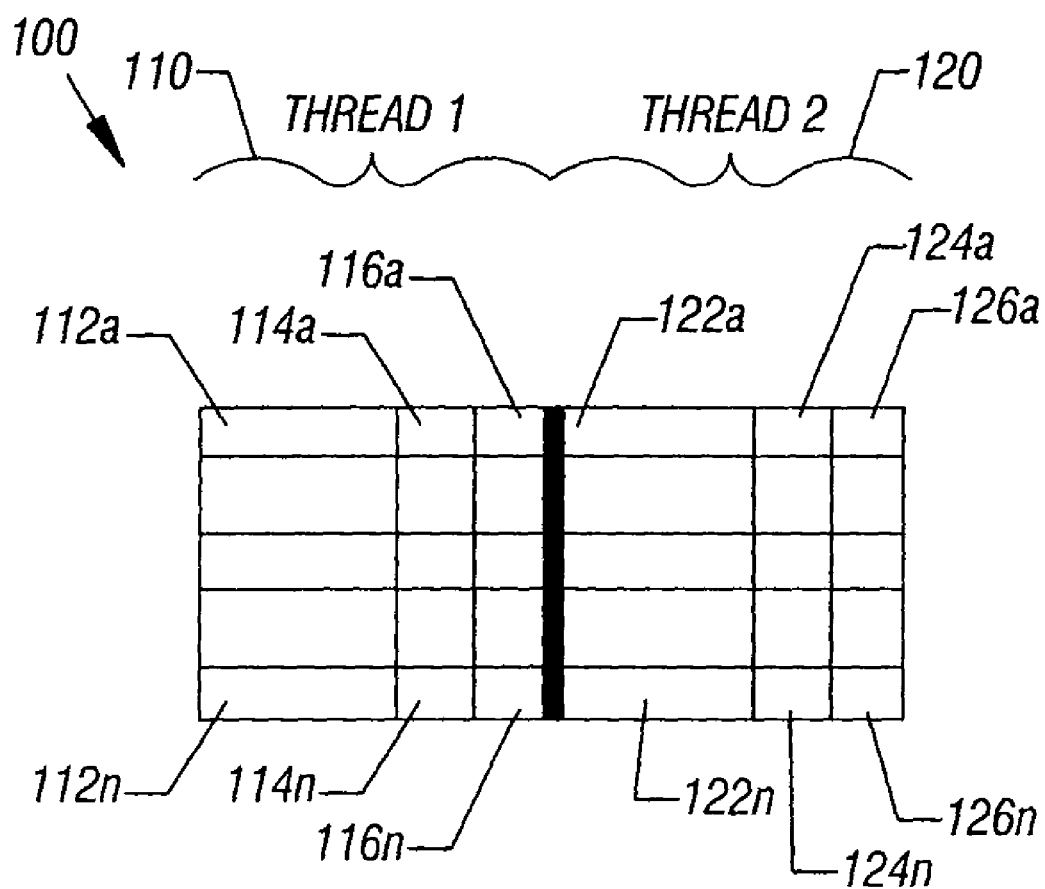
FIG. 2 is a block diagram of a scoreboard in accordance with an embodiment of the present invention.

Various structures may be present within a processor to enable register access and synchronization mechanisms in accordance with an embodiment of the present invention. Referring now to FIG. 2, shown is a block diagram of a scoreboard in accordance with an embodiment of the present invention that includes support for synchronization between multiple threads. As shown in FIG. 2, a scoreboard 100, which may be a storage present within a processor core, may include entries to store status information associated with registers of multiple register files. Specifically, in the embodiment shown in FIG. 2, each of a first thread and a second thread may include entries for each register in its register file. Thus as shown in FIG. 2, a first thread 110 may include a plurality of entries 112a-112n (generically entry 112). Each entry 112 may be indexed using a register identifier (ID), and each entry may include status information. In the specific embodiment shown in FIG. 2, a ready indicator 114a-114n (generically ready indicator 114) and a synchronization indicator 116a-116n (generically synchronization indicator 116) may be present. Ready indicator 114 may be used to indicate when the corresponding operand that is stored in the identified register is ready for use by consumer operations of that thread, while synchronization indicator 116 may indicate whether a remote operand that is to be accessed by the local thread is ready for access by the local thread, i.e., a producer instruction of the (remote) producer thread has executed and stored the appropriate value in the desired location. Note that a second thread 120 may also include a plurality of entries 122a-122n (generically entry 122) each associated with a register of its register file. Similarly, each entry 122 may include a corresponding ready indicator 124a-124n (generically ready indicator 124) and a synchronization indicator 126a-126n (generically synchronization indicator 126). Instead of separate entries for each thread, a scoreboard may be arranged to have a single entry for each corresponding register of the multiple threads, with different portions of the entry associated with each thread. Further, while shown with this particular configuration in the embodiment of FIG. 2, it is to be understood the scope of the present invention is not limited in this regard and in various embodiments, different manners of generating, storing and using status information associated with register files of different threads may be realized. For example, different processor architectures may have different control configurations to analyze instructions and issue them to one or more execution units of the processor. Some processors may include allocators, reservation stations, scoreboards, controllers and other varieties of logic to determine when a decoded instruction has various resources needed for execution available and select, either on an in-order or out-of-order basis, which instruction to provide to an execution unit. In various embodiments, scoreboard 100 may be part of an instruction issuer, in whatever form available in a given processor architecture, or may be coupled to such an instruction issuer or other such logic to enable instruction issuance decisions to be made based on the information present in scoreboard 100.

Figure 3:
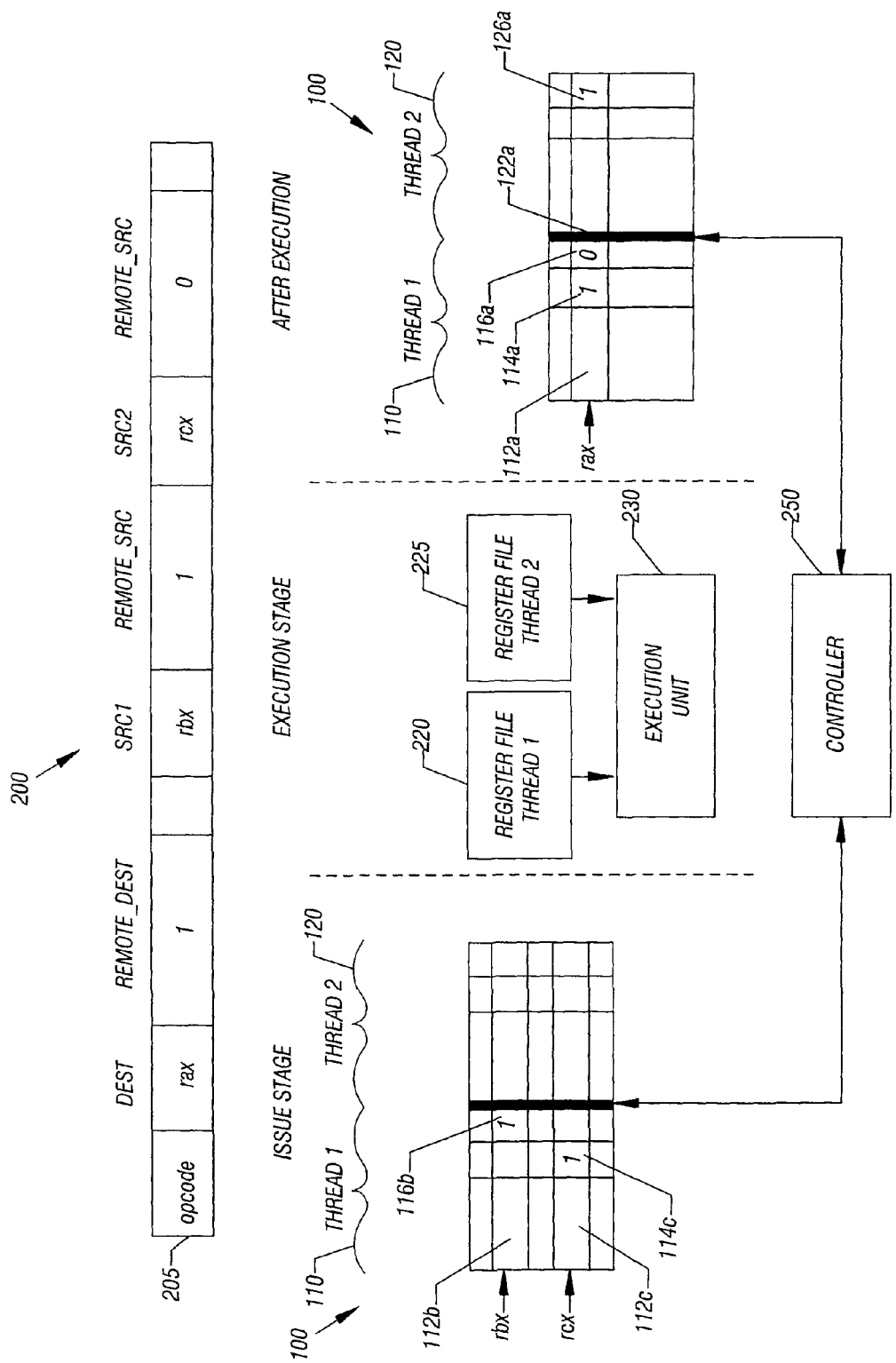
FIG. 3 is a block diagram of an implementation of instruction execution in accordance with an embodiment of the present invention.

As described above, in various embodiments flow information associated with an instruction may be analyzed to determine whether an instruction is to access information present in a register of another thread and/or whether a result of the instruction may be accessed by a different thread. Referring now to FIG. 3, shown is a block diagram of an implementation of instruction execution in accordance with an embodiment of the present invention. As shown in FIG. 3, a system 200 may include an execution unit 230 that performs various operations on incoming data. In the embodiment shown in FIG. 3, a first register file 220 and a second register file 225 may be coupled to execution unit 230. In the embodiment of FIG. 3, first register file 220 may be associated with a first thread, while second register file 225 may be associated with a second thread. While shown as separate register files in the embodiment of FIG. 3, understand that in some implementations a global register file may be present, with a first portion logically associated with the first thread and a second portion logically associated with the second thread. As shown in FIG. 3, an instruction 205 from the first thread to be performed by execution unit 230 may include an opcode to identify a type of instruction, e.g., an addition operation, multiplication or other operation. Instruction 205 further identifies a destination for the result, namely a destination operand, which may correspond to a first register, rax. Associated with this destination operand is a locality indicator, identified in FIG. 3 as REMOTE_DEST. As shown in FIG. 3, this locality indicator has a value of one, which indicates that the destination operand is to be later accessed by a remote thread, i.e., the second thread in the example of FIG. 3, and may be accessed by consumer instructions in the local thread as well. As further shown, instruction 205 also identifies two source operands, namely a first source operand (SRC1) that accesses a register rbx. Because a locality indicator of this source operand (i.e., REMOTE_SRC) is set at a value of one, this source operand may be accessed from a remote register file, i.e., register file 225. Similarly, instruction 205 includes a second source operand (SRC2) that is to access a second register, rcx, which may be obtained from first register file 220, as the locality indicator for this second source operand (i.e., REMOTE_SRC) is set at a value of zero.

Because one of the source operands is to be accessed from a different register file, i.e., second register file 225, instruction 205 may not proceed until a synchronization indicator associated with that source operand is active (e.g., set). Furthermore, instruction 205 may not proceed until a ready indicator associated with the second source operand is also active. Thus as shown in FIG. 3, scoreboard 100 includes a first entry 112b associated with the first source operand and a second entry 112c associated with the second operand. When a value of ready indicator 114c is set and a value of synchronization indicator 116b is also set, instruction 205 may be issued to execution unit 230. This is so, as the appropriate values in registers rbx in first register file 225 and rcx in second register file 220 are present. Accordingly, execution unit 230 may read rcx from first register file 220 and read rbx from second register file 225. Once the instruction has been executed, the result may be stored in the destination register rax of first register file 220. Furthermore, updating of various ready and synchronization indicators may occur. Specifically, as shown in FIG. 3, after execution, an entry 112a associated with the first thread may be updated to have a ready indicator 114a having a value of one and a synchronization indicator 116a having a value of zero. Furthermore, entry 126a associated with the second thread may have a corresponding synchronization indicator 116a set at a value of one to indicate that the appropriate value is present in register rax, which acts as a source operand for a consumer instruction of the second thread. While shown with this particular implementation in the embodiment of FIG. 3 the scope of the present invention is not limited in this regard.

As further shown in FIG. 3, a controller 250 may be present within system 200. Controller 250 may include various hardware, software, firmware or combinations thereof to handle issuance of instructions from each of the threads to execution unit 230. As shown in FIG. 3, controller 250 may be coupled to scoreboard 100 to analyze the state information present in various entries therein to determine whether source operands of a given instruction are ready for execution based on analysis of the associated ready and/or synchronization indicators. In one embodiment, controller 250 may implement logic functionality to enable issuance of instructions when the instruction's source operands are available. For example, in one implementation if local sources are indicated (i.e., the locality indicators associated with the source operands point locally (e.g., have a logic low value)), the functionality may correspond to a logic AND operation in which the ready indicators for the local source operands can be analyzed to determine whether they are both indicative of a ready state. If not, the instruction may be held until both ready indicators are set, e.g., at a logic high state indicative of a ready status. If instead one of two source operands are indicated to be of a remote origin, the logic operation may correspond to a logic AND operation in which a local ready indicator for the local operand and a local synchronization indicator for the remote operand are checked to determine whether both are indicative of the availability of the operands. If so, the operation may proceed, otherwise controller 250 may hold the operation until both such source operands are ready, as indicated by their associated ready and synchronization indicators. While described with this particular implementation, the scope of the present invention is not limited in this regard, and many different manners of analyzing information in a scoreboard or other structure to determine when source operands are ready for use in a consumer instruction may be realized. For example, in other implementations a multiple core processor such as a dual core or many-core processor may similarly implement embodiments of the present invention. In some such implementations a first thread executing on a first core may access a register file associated with a different thread executing on another core. In doing so, certain amounts of overhead may be expended in accessing such remote register files during execution of a given thread, however.

Accordingly, based on flow information associated with the instruction, i.e., flags or flowmarks for the various source and destination operands, lightweight accessing of a different register file and synchronization may be enabled. In various implementations, different entities may generate threads and corresponding code, for example, a dynamic optimizer, a compiler, a hardware optimizer, and so forth. Whatever entity generates such code may mark instructions with appropriate flowmarks. Furthermore, the entity may guarantee that a register that is involved in a producer/consumer relationship is not redefined in the producer thread before it is read by the consumer thread. In various embodiments, synchronization points may be set between threads so that the producer thread does not proceed until the consumer thread has read the associated value. While the scope of the present invention is not limited in this regard, in some embodiments such synchronization points may be implemented using the synchronization indicators described above. For example, while the flowmarks described in the embodiment of FIG. 3 may be one-bit indicators to indicate whether an operand is present in a local or remote location, other embodiments may extend such locality indicators to multiple bits to indicate presence in more than two such threads. That is, in some implementations more than two threads may be executing in a given core or multiple cores. During execution of any one of the threads, the register files associated with the other threads may be accessed according to flowmarks in the instructions and information in a scoreboard or other such structure to indicate availability of remote operands, e.g., via synchronization indicators associated with the register files associated with these multiple threads.

Figure 4:
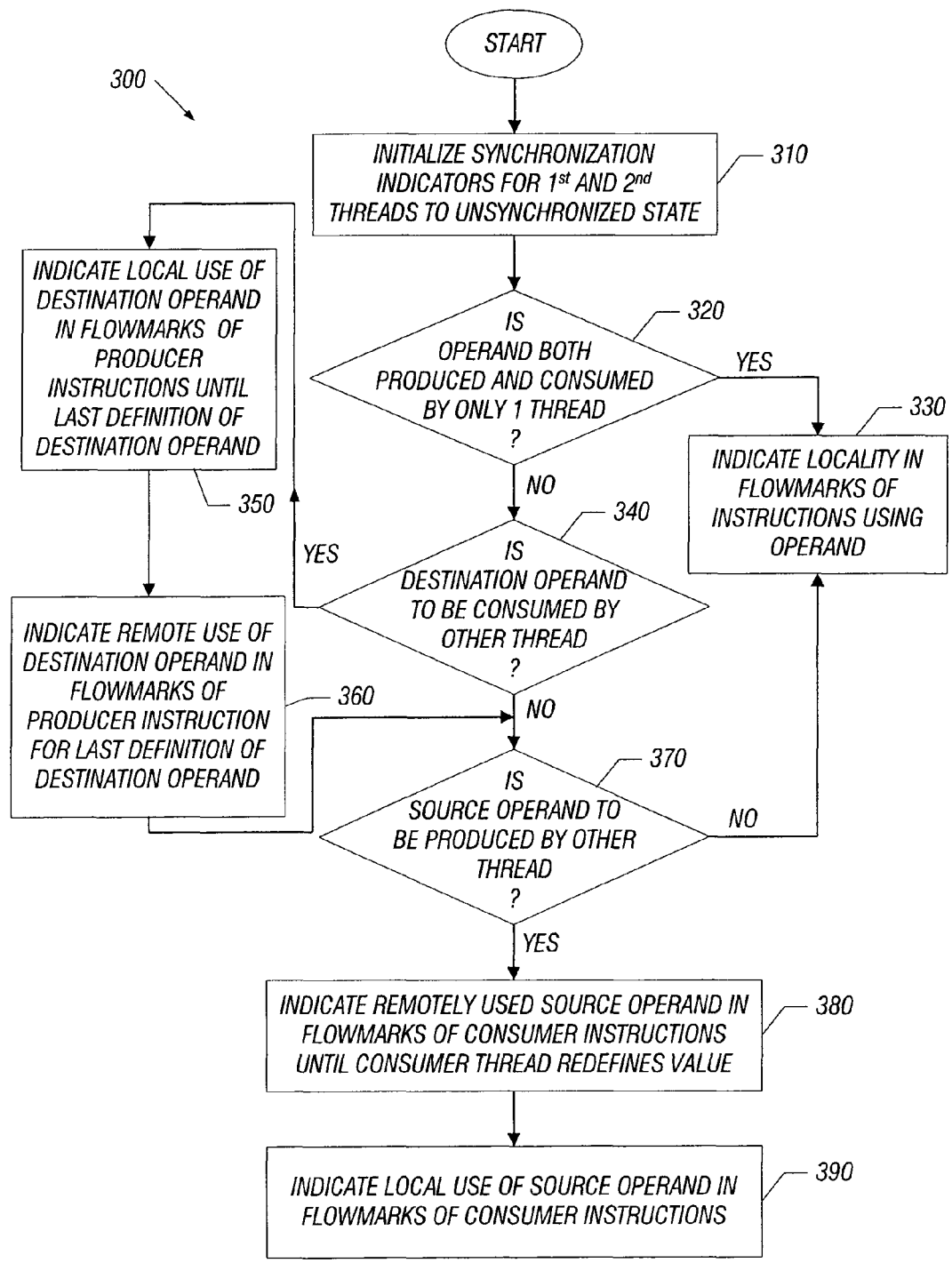
FIG. 4 is a flow diagram of a method for generating flowmark information in accordance with an embodiment of the present invention.

In some embodiments code traces may be generated by a dynamic optimizer. However, in other implementations compiler-based support or other mechanisms may be used to generate instructions with appropriate flowmark information. Referring now to FIG. 4, shown is a flow diagram of a method for generating flowmark information in accordance with an embodiment of the present invention. As shown in FIG. 4, method 300 may begin by initializing synchronization indicators for first and second threads to an unsynchronized state (block 310). For example, the two threads may be code traces generated by a dynamic optimizer. More so, these multiple traces may be executed simultaneously by different threads on a single processor core, namely first and second threads. To ensure proper attribution of various operands, the synchronization indicators may be initialized to an unsynchronized state, for example, a logic value of zero in some embodiments. Note that because these traces are identified by the dynamic optimizer, the optimizer may have control of which registers are involved in a producer/consumer manner and thus the optimizer may also control presence of a synchronization point at which time the operands may be synchronized. Although a register that is consumed remotely can be defined many times in the producer thread, the optimizer may guarantee that that the last definition of a register prior to use by a consumer is the definition that sets the producer/consumer relationship.

Referring still to FIG. 4, next control may pass to diamond 320, where it may be determined whether an operand is both produced and consumed by only a single thread. If an operand is used in a single thread, control may pass to block 330, where locality of use may be indicated in the flowmarks of instructions using the operand. Specifically, where this operand is used, either as a source or destination operand, a corresponding locality indicator, i.e., flowmark, may be in a reset state (e.g., logic zero) to indicate that that operand is used only locally.

Referring still to FIG. 4, if instead at diamond 320 it is determined that an operand is used by multiple threads, control may pass to diamond 340. At diamond 340 it may be determined if the identified operand is a destination operand that is to be consumed by another thread. If so, control passes to block 350, where local uses of the destination operand may be identified accordingly with flowmarks of producer instructions until a last definition of the destination operand (i.e., last definition before use by the consumer thread) is reached. When this last definition is reached, control passes to block 360, where this instruction may be identified with a flowmark to indicate remote usage of the destination operand. In other words, this instruction may have a locality indicator for the destination operand in a set state (e.g., logic one). From block 360 control passes to diamond 370, where it may be determined whether a source operand is to be produced by the other thread. If not, control passes back to block 330, discussed above where the flowmarks associated with the operand may be indicated as being local (i.e., a logic value of zero).

Referring still to FIG. 4, if instead at diamond 370 it is determined that the source operand is to be produced by the other thread, control may pass to block 380, where the use of a remote source operand may be indicated in flowmarks of consumer instructions of that thread until an instruction in that same thread redefines that register (block 380). That is, instructions of the consumer thread may access the data value in the remote register file, until the consumer thread redefines the register. When (if) such an event happens, control passes to block 390 where local use of the source operand may be indicated in flowmarks of the consumer instructions. That is, when a consumer instruction redefines the register such that it writes a different value that is then used as a source operand for later instructions of that same thread, the later instructions of the same thread may have flowmarks associated with them to indicate that the source operand may now be obtained locally. While shown with this particular implementation in the embodiment of FIG. 4, the scope of the present invention is not limited in this regard.

Thus in various embodiments, two threads running on the same core may be synchronized via direct access of each other's registers. By accessing information at the register level, synchronization overheads of obtaining information from a different thread via indirect memory may be reduced and memory bandwidth issues can be alleviated. Via use of registers of register files present in the core, communication of 64-bit or 128-bit values may occur between two threads running on the same core. In this way, there may be no need to replicate a register state for a newly spawned thread, as operands to be used by the newly spawned thread can be directly read from the register file of the spawning thread. While the scope of the present invention is not limited in this regard, embodiments may be used in fine-grain threaded paradigms such as speculative multithreading, helper thread processing, and run-ahead threads, for example. Accordingly, the instructions present in such threads may be reduced, as copy or other instructions to replicate architectural state of a first register file may be avoided. Instead, these additional threads may directly obtain needed information from another thread's register file.

Figure 5:
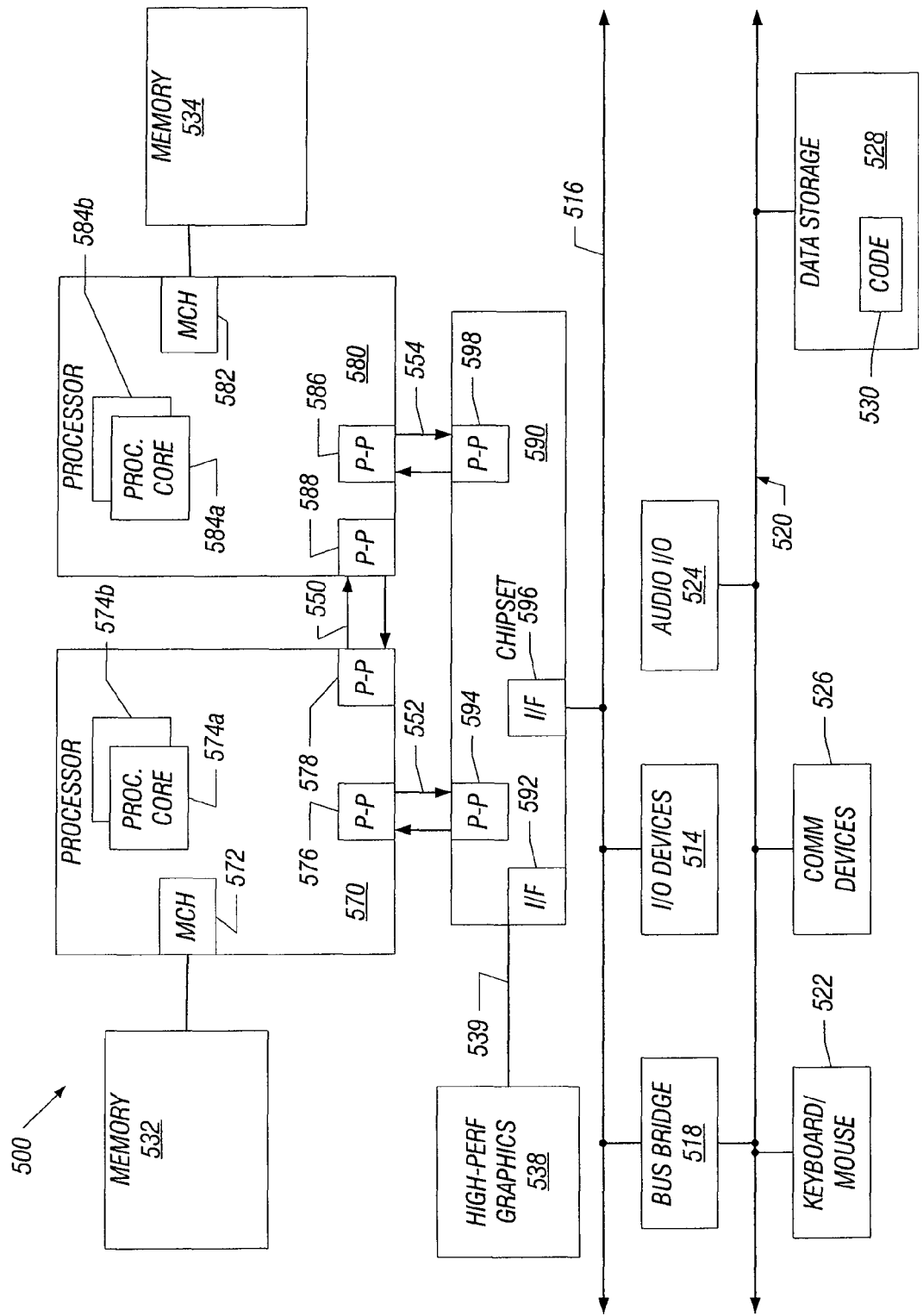
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Note that each of the cores may include multiple register files each for use by a different thread. Further, each core may include hardware, software or firmware to enable direct access by a consumer thread to a producer thread's register file, e.g., via flowmarks and synchronization indicators in accordance with an embodiment of the present invention. Still further, in some implementations a thread running on processor core 574a may access a register file associated with a thread running on processor core 574b, and vice versa.

First processor 570 further includes point-to-point (P-P) interfaces 576 and 578. Similarly, second processor 580 includes P-P interfaces 586 and 588. As shown in FIG. 5, memory controller hubs (MCH's) 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 5, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
accessing a register file of a second thread by a core to obtain a source operand for an instruction of a first thread during execution of the instruction of the first thread on the core responsive to decoding the instruction including a location indicator and a source identifier for the source operand, wherein the location indicator for the source operand indicates that the source operand is located in the register file of the second thread and the source identifier indicates a source register in the register file of the second thread which stores the source operand, and further responsive to decoding the instruction including a location indicator and a destination identifier for a destination operand, wherein the location indicator for the destination operand indicates that the destination operand is to be accessed by the second thread, storing a result of the execution of the instruction as the destination operand in a destination register of a register file of the first thread indicated by the destination identifier, the core a common core on which the first and second threads execute.

2. The method of claim 1, further comprising:
preventing the instruction of the first thread from executing if a synchronization indicator associated with the source register identified by the source identifier is of a first state indicative of incompletion of a producer operation of the second thread; and
executing the instruction of the first thread if the synchronization indicator associated with the source register is of a second state indicative of completion of the producer operation of the second thread.

3. The method of claim 2, further comprising setting the synchronization indicator in an entry of a scoreboard for the source register after the producer operation is completed.

4. The method of claim 3, further comprising setting the synchronization indicator in the entry of the scoreboard for the source register associated with the first thread and resetting the synchronization indicator in the entry of the scoreboard for the source register associated with the second thread after the producer operation is completed.

5. The method of claim 2, further comprising executing the producer operation of the second thread and the instruction of the first thread in the core.

6. The method of claim 1, further comprising:
storing the result of the instruction of the first thread in the destination register of the register file of the first thread and updating a synchronization indicator for the destination register based on the location indicator for the destination operand in the instruction of the first thread.

7. An apparatus comprising:
a storage to store entries each corresponding to a register in a first register file of a first thread, each of the entries to include a synchronization indicator to indicate whether a producer operation of a second thread that is to use a corresponding register of a second register file of the second thread as a destination register has completed and a ready indicator to indicate whether an operand stored in the register in the first register file is only to be used by a consumer operation of the first thread; and
a controller to update the synchronization indicator of the first thread of an entry for the corresponding register after the second thread executes an instruction that uses the corresponding register of the second register file as the destination register, wherein the instruction includes a locality indicator for the destination operand indicative of direct access of the corresponding register of the second register file by the first thread and a destination identifier that identifies the destination register.

8. The apparatus of claim 7, wherein a core is to simultaneously execute the first thread and the second thread using the first register file and the second register file; and is to access the second register file during execution of the first thread.

9. The apparatus of claim 7, wherein a core is to access the second register file based on a locality indicator for a source operand of an instruction of the first thread and the synchronization indicator of an entry for the corresponding register.

10. The apparatus of claim 7, wherein the apparatus comprises a core including the storage, the first register file, the second register file and an execution unit, wherein the execution unit is to obtain a source operand from a register of the second register file for execution of an instruction of the first thread based on a locality indicator of the instruction of the first thread.

11. The apparatus of claim 10, wherein the instruction of the first thread is to be prevented from executing if the synchronization indicator of an entry associated with the register of the second register file is indicative of an incomplete status of a producer instruction of the second thread.

12. A system comprising:
a first register file including a plurality of registers to store data of a first thread;
a second register file including a plurality of registers to store data of a second thread;
an execution unit coupled to the first register file and the second register file to execute instructions of the first thread and the second thread, wherein the execution unit is to directly access the first register file to obtain a source operand for execution of an instruction of the second thread based on a location indicator and a source identifier of the instruction of the second thread, the location indicator of the instruction of the second thread to indicate that the source operand is located in the first register file and the source identifier to indicate a source register in the first register file which stores the source operand;
an instruction issuer coupled to the execution unit to hold allocation of the instruction of the second thread until a synchronization indicator associated with the source register is active, and to write the synchronization indicator associated with the source register after a producer instruction of the first thread is executed, wherein the producer instruction includes a location indicator for a destination operand of the producer instruction to indicate that the destination operand is to be accessed by a remote thread; and
a dynamic random access memory (DRAM) coupled to the execution unit.

13. The system of claim 12, wherein the instruction issuer is to further write a ready indicator associated with the source register after the producer instruction of the first thread is executed.

14. The system of claim 13, wherein the instruction issuer is to write the synchronization indicator and the ready indicator in an entry of a scoreboard corresponding to the source register.

15. The system of claim 12, further comprising a first core including the execution unit, the first register file, and the second register file, wherein the first core is to process instructions of the first thread and the second thread.

16. The system of claim 15, further comprising: a second core including a second execution unit and a third register file, wherein the second core is to process instructions of a third thread, wherein the second core is to access at least one of the first register file and the second register file to obtain a source operand for use in the third thread.

17. The system of claim 12, further comprising a unified register file including the first register file and the second register file.

18. A non-transitory machine-readable storage medium having stored thereon instructions that if executed by a machine cause the machine to perform a method comprising:
accessing a register file of a first thread to obtain a first register source operand identified in an instruction of a second thread for execution of the instruction in a core if the instruction includes a location indicator for the first register source operand that indicates that the first register source operand is located in the register file of the first thread as a result of execution of a producer instruction of the first thread and a source identifier for the first register source operand that indicates a source register in the register file of the first thread which stores the first register source operand.

19. The machine-readable storage medium of claim 18, wherein the method further comprises accessing a register file of the second thread to obtain a second register source operand identified in an instruction of the first thread for execution of the instruction of the first thread if the instruction of the first thread includes a location indicator for the second register source operand that points to the second thread.

20. The machine-readable storage medium of claim 18, wherein the method further comprises preventing execution of the instruction of the second thread until an indicator associated with a register identified by the source identifier is active, the indicator indicative of completion of a producer operation of the first thread.

21. The machine-readable storage medium of claim 18, wherein the method further comprises executing the instruction of the second thread and thereafter activating a synchronization indicator associated with a register identified by a register destination identifier of the instruction of the second thread if the instruction of the second thread includes a location indicator for a register destination operand that points to the first thread.

22. The machine-readable storage medium of claim 18, wherein the method further comprises spawning the second thread from the first thread without replication of a state of the first thread to the second thread, and causing the second thread to access the register file of the first thread during execution of the instruction of the second thread.

* * * * *